United States Patent
Iwano

(10) Patent No.: US 10,087,966 B2
(45) Date of Patent: Oct. 2, 2018

(54) COMPONENT JOINING STRUCTURE AND COMPONENT JOINING METHOD

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 14/825,641

(22) Filed: Aug. 13, 2015

(65) Prior Publication Data

US 2016/0053788 A1    Feb. 25, 2016

(30) Foreign Application Priority Data

Aug. 22, 2014   (JP) .................................. 2014-169534

(51) Int. Cl.
| | |
|---|---|
| *F16B 5/08* | (2006.01) |
| *B29C 70/46* | (2006.01) |
| *B29C 70/76* | (2006.01) |
| *B29C 37/00* | (2006.01) |
| *B29C 70/12* | (2006.01) |
| *B29C 65/70* | (2006.01) |

(Continued)

(52) U.S. Cl.
CPC ............ *F16B 5/08* (2013.01); *B29C 37/0082* (2013.01); *B29C 65/70* (2013.01); *B29C 70/12* (2013.01); *B29C 70/46* (2013.01); *B29C 70/76* (2013.01); *B29K 2101/10* (2013.01); *B29K 2101/12* (2013.01); *B29K 2105/12* (2013.01); *B29K 2105/128* (2013.01); *B29K 2307/04* (2013.01); *B29K 2705/02* (2013.01); *B29K 2995/0098* (2013.01); *B29L 2031/3008* (2013.01); *B29L 2031/3014* (2013.01)

(58) Field of Classification Search
CPC ......... B29C 65/70; B29C 70/12; B29C 70/46; B29C 70/76; B29C 37/0082; B29C 2043/181; B29C 264/252; B29C 264/274; B29L 2031/3014; B29K 2105/12; B29K 2705/02; B29K 2105/128; F16B 5/08; F16B 5/00; F16B 5/0004; F16B 5/0096; F16B 11/002; Y10T 403/47; Y10T 403/472; Y10T 403/475; Y10T 403/4966; Y10T 403/74; Y10T 428/249933; Y10T 428/24994
USPC .................................................. 264/252, 274
See application file for complete search history.

(56) References Cited

U.S. PATENT DOCUMENTS

| | | |
|---|---|---|
| 4,041,031 A | 8/1977 | Heasman |
| 5,314,309 A | 5/1994 | Blakeley et al. |

(Continued)

FOREIGN PATENT DOCUMENTS

| | | |
|---|---|---|
| EP | 0 605 213 A1 | 7/1994 |
| JP | H04-255507 A | 9/1992 |

(Continued)

*Primary Examiner* — Jonathan P Masinick
(74) *Attorney, Agent, or Firm* — Oliff PLC

(57) ABSTRACT

A component joining structure having: a first component provided with a joint portion for joining components together; a second component formed from a resin material in which fibers are oriented in multiple directions; and a joined portion that is integrally formed to the second component using a resin material, that is in close contact with the joint portion and is joined to the joint portion, and in which the fibers are oriented in multiple directions.

3 Claims, 5 Drawing Sheets

(51) Int. Cl.
  *B29K 105/12* (2006.01)
  *B29L 31/30* (2006.01)
  *B29K 705/02* (2006.01)
  *B29K 101/10* (2006.01)
  *B29K 101/12* (2006.01)
  *B29K 307/04* (2006.01)

(56) References Cited

U.S. PATENT DOCUMENTS

| | | | |
|---|---|---|---|
| 5,695,704 A | 12/1997 | Sugiura et al. | |
| 8,049,120 B2* | 11/2011 | Prest | B29C 65/645 156/73.1 |
| 8,628,836 B2* | 1/2014 | Lynch | B23K 31/02 428/100 |
| 9,279,436 B2* | 3/2016 | Osada | F16B 3/00 |
| 2006/0163222 A1 | 7/2006 | Dance et al. | |
| 2007/0261224 A1* | 11/2007 | McLeod | B29C 37/0053 29/428 |
| 2009/0017242 A1* | 1/2009 | Weber | B29C 37/0082 428/35.7 |
| 2009/0081407 A1* | 3/2009 | Giraud | B29C 37/0082 428/98 |
| 2013/0052406 A1* | 2/2013 | Chen | B32B 3/10 428/119 |
| 2013/0322962 A1* | 12/2013 | Osada | F16B 3/00 403/361 |
| 2015/0111002 A1* | 4/2015 | Liu | B29C 59/14 428/161 |
| 2015/0118479 A1* | 4/2015 | Hon | B29C 45/14311 428/312.8 |
| 2015/0217821 A1* | 8/2015 | Campbell | B23K 11/115 29/428 |
| 2015/0290911 A1 | 10/2015 | Hirata et al. | |

FOREIGN PATENT DOCUMENTS

| | | |
|---|---|---|
| JP | H05-240324 A | 9/1993 |
| JP | H06-039861 A | 2/1994 |
| JP | H06-270263 A | 9/1994 |
| JP | H09-254266 | 9/1997 |
| JP | 2001-062936 A | 3/2001 |
| JP | 2006-501070 A | 1/2006 |
| JP | 2013-056474 A | 3/2013 |
| JP | 2013212603 A | 10/2013 |
| KR | 96-7002 | 5/1996 |
| WO | 2012/133013 A1 | 10/2012 |
| WO | 2014/007342 A1 | 1/2014 |

* cited by examiner

COMPONENT JOINING STRUCTURE AND COMPONENT JOINING METHOD

CROSS-REFERENCE TO RELATED APPLICATION

This application is based on and claims priority under 35 USC 119 from Japanese Patent Application No. 2014-169534 filed on Aug. 22, 2014, the disclosure of which is incorporated by reference herein.

BACKGROUND

Technical Field

The present invention relates to a component joining structure and to a component joining method.

Related Art

Component manufacturing technology is disclosed in Japanese Patent Application Laid-Open (JP-A) No. 2013-212603. In this component manufacturing technology, a carbon fiber reinforced resin sheet is superimposed on a metal sheet, and the metal sheet and the carbon fiber reinforced resin sheet are integrally molded together by press working.

In the above component manufacturing technology, the metal sheet and the carbon fiber reinforced resin sheet are integrated together merely by bonding using press working, and there is room for improvement from the perspective of join strength between both members.

SUMMARY

In consideration of the above circumstances, an object of the present invention is to obtain a component joining structure and a component joining method that are capable of raising the join strength between components including a component formed from a resin provided with fibers.

A component joining structure according to a first aspect of the present invention includes: a first component provided with a joint portion for joining components together; a second component formed from a resin material in which fibers are oriented in multiple directions; and a joined portion that is integrally formed to the second component using a resin material, that is in close contact with the joint portion and is joined to the joint portion, and in which the fibers are oriented in multiple directions.

In the component joining structure according to the first aspect, the first component is provided with the joint portion for joining components together. The second component is formed from the resin material in which fibers are oriented in multiple directions, and the joined portion is integrally formed to the second component using a resin material. The first component and the second component are joined together by the joined portion being in close contact with the joint portion and joined to the joint portion.

The fibers in the second component are oriented in multiple directions, and the fibers in the joined portion are oriented in multiple directions. There is accordingly only a small anisotropy in strength of the joined portion, enabling the strength of the joined portion to be raised.

The component joining structure according to the first aspect exhibits the excellent advantageous effect of enabling the join strength to be raised between the first component and the second component formed from the resin provided with fibers.

A component joining structure according to a second aspect of the present invention is a component joining structure according to the first aspect, wherein the joint portion is a protruding shape on part of the first component and is configured with a protrusion leading end portion that juts out in a direction toward the periphery of the joint portion, and the joined portion is a recessed shape on part of the second component, capable of housing the joint portion and configured with a recess bottom portion that juts out further in a direction toward the periphery of the joined portion than a recess opening portion.

In the component joining structure according to the second aspect, the locations where the protrusion leading end portion of the joint portion juts out in a direction toward the periphery acts as an anchor portion, and the location where the recess bottom portion of the joined portion juts out in a direction toward the periphery acts as an anchored portion, enabling the joined portion to be anchored to the joint portion.

A component joining structure according to the third aspect of the present invention is the component joining structure according to the first aspect, wherein the joint portion is a recessed shape on part of the first component and is configured with a recess bottom portion that juts out further in a direction toward the periphery of the joint portion than a recess opening portion, and the joined portion is a protruding shape on part of the second component, capable of being housed in the joint portion and configured with a protrusion leading end portion that juts out in a direction toward the periphery of the joined portion.

In the component joining structure according to the third aspect, the location where the recess bottom portion of the joint portion juts out in a direction toward the periphery act as an anchor portion and the location where the protrusion leading end portion of the joined portion juts out in a direction toward the periphery act as an anchored portion, enabling the joined portion to be anchored to the joint portion.

The component joining structure according to the second aspect or the third aspect exhibits the excellent advantageous effect of enabling the effectiveness to be raised of preventing the second component from being pulled away from the first component.

A component joining structure according to a fourth aspect of the present invention is the component joining structure according to the first aspect, wherein the density of the fibers is uniform in the joined portion.

In the component joining structure according to the fourth aspect, the density of the fibers is uniform in the joined portion, enabling variation in strength of the joined portion to be reduced. This thereby enables the strength of the joined portion to be raised.

The component joining structure according to the fourth aspect exhibits the excellent advantageous effect of enabling the quality of the join strength between the first component and the second component to be raised.

A component joining method according to a fifth aspect of the present invention includes: joining a first component and a second component together by press molding the second component formed from a resin material in which fibers are oriented in multiple directions onto or into a joint portion for component joining of the first component, and using the second component to form a joined portion that is in close contact with the joint portion and joined to the joint portion.

In the component joining method according to the fifth aspect, the second component is press molded onto or into the joint portion for component joining of the first component. Due to the press molding, the second component is formed with the joined portion that is in close contact with the joint portion and joined to the joint portion, and the first component and the second component are joined.

The second component is formed by the resin material in which fibers are oriented in multiple directions. When the resin material is press molded, the resin material flows uniformly in the press direction and in peripheral directions to the press direction. The fibers flow uniformly together with the flow of the resin material. This thereby enables the joined portion to be formed by the resin material in which the fibers are oriented in multiple directions. Moreover, the flow of the resin material is uniform, thereby enabling the joined portion to be formed by the resin material in which the density of the fibers is uniform.

The component joining method according to the fifth aspect exhibits the excellent advantageous effect of enabling fibers of the second component and the joined portion to be oriented in multiple directions, and also of enabling a uniform density of the fibers of the second component and the joined portion.

A component joining method according to a sixth aspect of the present invention is the component joining method according to the fifth aspect, wherein the joint portion is a protruding shape on part of the first component and is formed with a protrusion leading end portion that juts out in a direction toward the periphery of the joint portion, and the joined portion is formed by press molding a resin material such that the joint portion is interposed between plural resin material portions.

In the component joining method according to the sixth aspect, the joined portion is formed by press molding the resin material such that the joint portion is interposed between plural resin material portions, so that the joined portion is formed by resin material that has flowed uniformly along the outline profile of the protruding shape of the joint portion and the projection leading end portion. The fibers provided in the resin material also flow together with the flow of the resin material. This thereby enables the joined portion to be formed by resin material including fibers that are oriented in multiple directions, and that has a uniform density of fibers. Moreover, the joined portion can be formed such that the resin material and the fibers are able to flow completely around the outline profile of the joint portion.

A component joining method according to a seventh aspect of present invention is the component joining method according to the fifth aspect, wherein the joint portion is a recessed shape on part of the first component and is formed with a recess bottom portion that juts out further in a direction toward the periphery of the joint portion than a recess opening portion, and the joined portion is formed by press molding so that the resin material flows into the joint portion and is caulked into the joint portion.

In the component joining method according to the seventh aspect, the joined portion is formed by press molding the resin material into the joint portion, and so the joined portion is formed by the resin material that has flowed uniformly along the outline profile of the recessed shape of the joint portion and along the recess bottom portion. The fibers provided in the resin material also flow together with the flow of the resin material. This thereby enables the joined portion to be formed by the resin material in which fibers are oriented in multiple directions, and in which the density of the fibers is uniform. Moreover, the joined portion is formed in which the resin material and the fibers are able to flow completely around the outline profile of the joint portion.

The component joining method according to the sixth aspect or the seventh aspect exhibits the excellent advantageous effect of causing fibers of the joined portion to be oriented in multiple directions and with a uniform density of fibers, and enabling the resin material and the fibers of the joined portion to flow completely around the outline profile of the joint portion.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
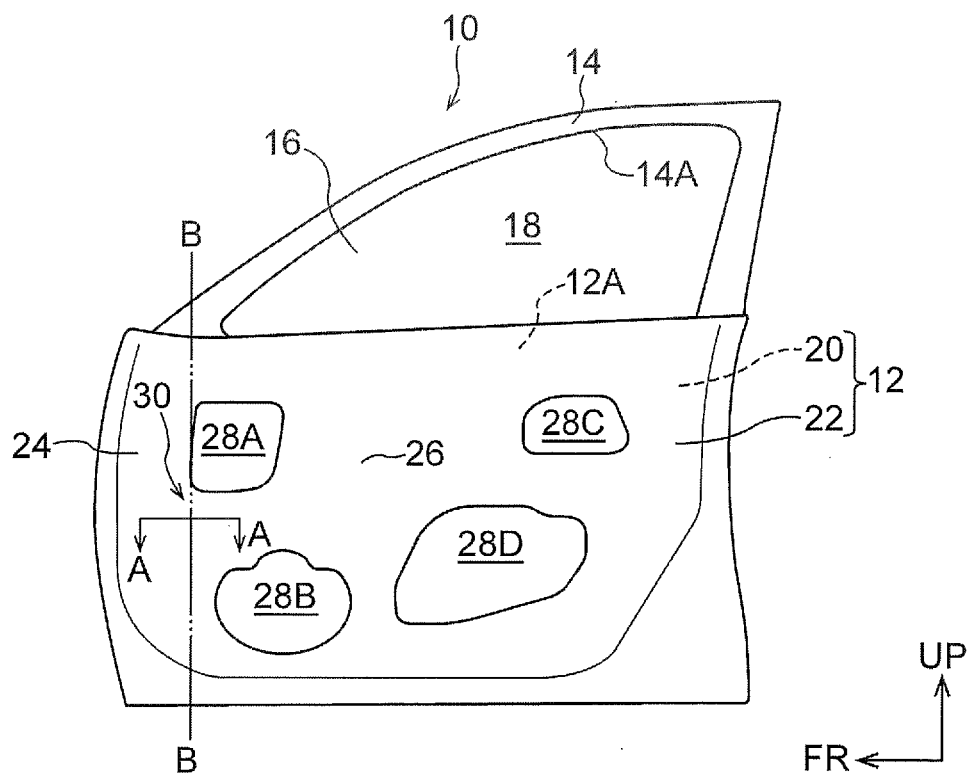
FIG. 1 is a side view of a component joining structure according to a first exemplary embodiment applied to a vehicle front side door, as viewed from inside a vehicle cabin.

Explanation follows regarding a component joining structure and a component joining method according to a first exemplary embodiment of the present invention, with reference to FIG. 1 to FIG. 5. In the drawings, as appropriate, an arrow FR indicates a vehicle front direction of an automobile applied with the present exemplary embodiment, and the arrow IN indicates a vehicle width direction inside thereof. An arrow UP indicates the vehicle upwards direction. The direction in which the component joining structure and the component joining method are applied to a vehicle body, such as that of an automobile, are not limited to the modes of the present exemplary embodiment.

Side Door Structure

As illustrated in FIG. 1, a front side door 10 of a four-door (or two-door) automobile applied with a component joining structure 30 according to the present exemplary embodiment includes a door main body 12, and a door frame 14 provided at an upper portion of the door main body 12. The front side door 10 configures a vehicle body side section.

The door main body 12 includes an outer door panel 20, and an inner door panel 22 provided further to the vehicle width direction inside than the outer door panel 20. A window regulator or the like, not illustrated in the drawings, is housed inside the door main body 12 between the outer door panel 20 and the inner door panel 22 for raising and lowering a door glass 16. A window opening 18 is formed surrounded at the periphery by an upper edge 12A (a door belt molding) of the door main body 12 and by an inner peripheral edge 14A of the door frame 14. The window opening 18 is capable of being opened or closed by lowering or raising the door glass 16. An opening 28A and an opening 28B are respectively provided at the top and bottom at the vehicle front side of the inner door panel 22, and an opening 28C and an opening 28D are respectively provided at the top and bottom of the vehicle rear side of the inner door panel 22.

Component Joining Structure

In the present exemplary embodiment, as illustrated in FIG. 1, the inner door panel 22 of the door main body 12 is divided into a first component 24 provided at the vehicle front side, and a second component 26 provided at the vehicle rear side, with a boundary exactly along the line B-B. The first component 24 and the second component 26 are joined together, and a component joining structure 30 according to the present exemplary embodiment is applied to the joining.

Figure 2:
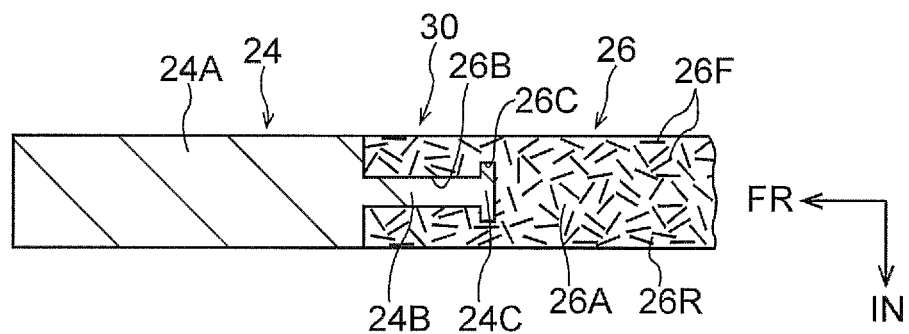
FIG. 2 is a cross-section of the component joining structure illustrated in FIG. 1, as viewed from above the vehicle (a cross-section taken along line A-A in FIG. 1)

As illustrated in FIG. 1 and FIG. 2, the first component 24 includes a rectangular plate shaped component main body 24A with its length direction along vehicle up-down direction, and its short length direction along the vehicle front-rear direction. Configuration is made with a hinge or the like attached to the first component 24 for opening and closing the front side door 10 with respect to a front pillar (A pillar), not illustrated in the drawings. The first component 24 is formed from a metal material such as steel, a light metal material such as aluminum, or an alloy material thereof.

In the first component 24, an end portion at the vehicle rear side of the component main body 24A is a location where components are joined together, and a joint portion 24B for joining the second component 26 to the end portion of the component main body 24A is provided at this location. The joint portion 24B is configured with a protruding shape that projects out from the end portion of the component main body 24A toward the vehicle rear side, and protrusion leading end portions 24C of the joint portion 24B jut out in directions toward the periphery of the joint portion 24B (the vehicle width directions). The joint portion 24B is configured with the protrusion leading end portions 24C jutting out in directions toward the periphery thereof, so as to configure a T-shape in plan view. Although not shown in vehicle side view, the joint portion 24B extends along the vehicle up-down direction. Plural of the joint portions 24B may be formed at fixed intervals along the vehicle up-down direction.

The second component 26 includes a rectangular plate shaped component main body 26A that extends along the vehicle front-rear direction and the vehicle up-down direction. In the second component 26, the end portion at the vehicle front side of the component main body 26A is a location where components are joined together, and a joined portion 26B that is in close contact with the joint portion 24B of the first component 24 and joined to the joint portion 24B is provided to the end portion of the component main body 26A. The joined portion 26B is configured with a recessed shape of a hollow from the end portion of the component main body 26A toward the vehicle rear side and capable of housing a hollow joint portion 24B, and a recess bottom portion 26C of the joined portion 26B is configured so as to jut out in directions toward the periphery of the joined portion 26B (the vehicle width directions). Namely, similarly to the joint portion 24B, the joined portion 26B configures a T-shape in plan view. The second component 26 is joined to the first component 24 by the joined portion 26B being joined to the joint portion 24B.

The component main body 26A of the second component 26 formed by a resin material 26R in which fibers 26F are oriented in multiple directions and at a uniform density of fibers 26F. The entire body of the joined portion 26B is formed by the resin material 26R including the fibers 26F oriented in multiple directions and at a uniform density of fibers 26F. The multiple direction orientation of the fibers 26F means that there is not a single direction of orientation of the fibers 26F, but rather plural directions of orientation in three dimensions, such that there is no particular directionality in the orientation of the fibers 26F. Uniform density of the fibers 26F indicates that even if there is some variation in the content of the fibers 26F per unit volume provided in the resin material 26R, variation in content of the fibers 26F at any location is within a range of 10%. As long as the variation in the content of the fibers 26F is within a range of 20% then it is possible to treat the density as being a uniform category.

The resin material 26R provided with the fibers 26F is generally called a composite member. As a more precise explanation, the composite member employs a thermoplastic resin material as the resin material 26R, and is a carbon fiber reinforced plastic (CFRP) in which carbon fibers (CF) are provided as the fibers 26F within the thermoplastic resin material. Carbon fiber reinforced plastics have high strength, and are lighter than metal materials, for example, and are perfectly suited as materials for the inner door panel 22. A carbon fiber reinforced plastic can also be employed as a design surface (decorative surface) inside a vehicle cabin. In the present exemplary embodiment, the carbon fibers employ short fibers with a length of 10 mm or shorter, and preferably employ short fibers with a length of 5 mm or shorter.

More specifically, as the thermoplastic resin material, it is possible to employ a resin material that is any out of a polypropylene resin, a polyamide resin (for example ID Codes PA6, PA66, PA610, and PA10T), an aromatic polyamide resin, a semi-aromatic polyamide resin, a polyphenylene sulfide (PPS) resin, a polyethylene terephthalate (PET) resin, a polybutylene terephthalate (PBT) resin, a polycarbonate (PC) resin, an acrylic resin (PMMA), an ABS resin, or a thermoplastic epoxy resin. As the fibers 26F provided in the thermoplastic resin material, other than carbon fibers, it is also possible to employ any fibers out of glass fibers (GF), aramid fibers, basalt fibers, bamboo fibers, metal fibers such as steel fibers, cellulose fibers, or polypropylene fibers (self-reinforcing type).

Other than thermoplastic resin materials, it is also possible to employ a thermoset resin material as the resin material 26R. It is possible to employ any resin material out of epoxy resins, urethane resins, vinyl ester resins, unsaturated polyester resins, and phenolic resins as the thermoset resin material. It is possible to employ the same fibers as the fibers 26F provided in the thermoset resin material as the fibers provided in the thermoplastic resin material.

Component Joining Method

Figure 3:
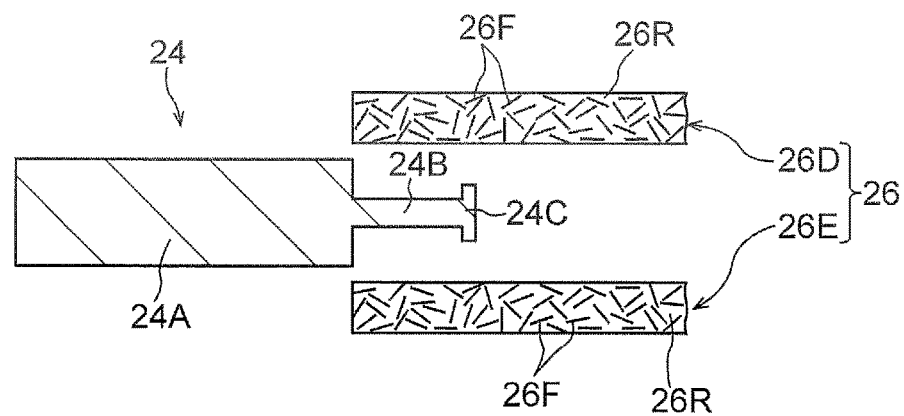
FIG. 3 is a first process cross-section to explain a component joining method according to the first exemplary embodiment.

A component joining method according to the present exemplary embodiment is as described below. First, as illustrated in FIG. 3, the first component 24 and plural sheets (in this case two sheets) of the sheet shaped half component main bodies 26D, 26E are formed. The first component 24 includes, as described above, a joint portion 24B on part of the component main body 24A. The half component main bodies 26D, 26E in this case each have a thickness that is half the thickness of the second component 26, and are formed from the resin material 26R including fibers 26F oriented in multiple directions and there is a uniform density of fibers 26F. A carbon fiber reinforced plastic is employed as the second component 26 here, and carbon fibers contained at from 20% by volume to 40% by volume are included as the fibers 26F in the thermoplastic resin material serving as the resin material 26R. More precisely, the carbon fiber reinforced plastic is formed from sheet shaped resin materials each having a thickness of 0.1 mm to 0.2 mm in which the fibers 26F are oriented in one direction, with several to several tens of sheets thereof superimposed on each other with varying orientations to each other of the fibers 26F.

Then pre-heating is performed, and the half component main bodies 26D, 26E softened by pre-heating. The heating temperature of the pre-heating is 300° C., and the pre-heating time is 5 minutes. In the component joining method according to the present exemplary embodiment pre-heating is performed to the entire half component main bodies 26D, 26E, however pre-heating may be performed to portions of the half component main bodies 26D, 26E that are to be the joining locations.

Figure 4:
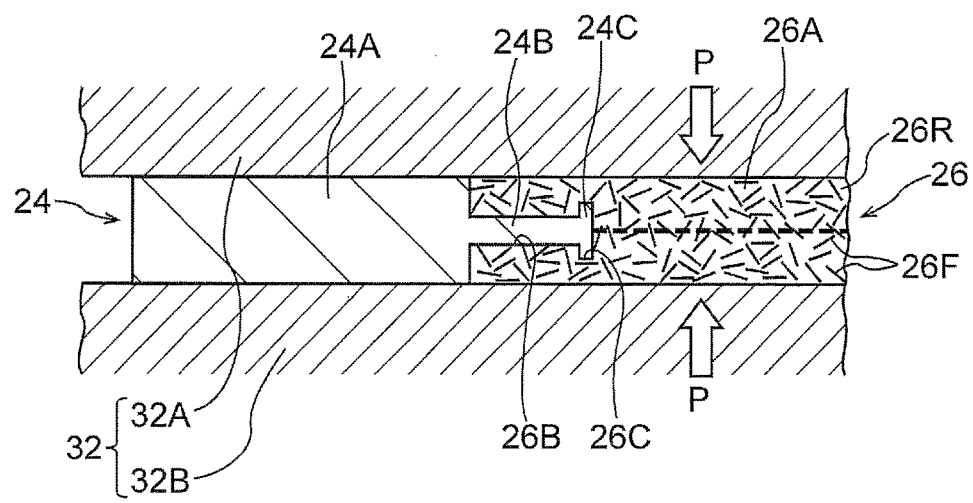
FIG. 4 is a second process cross-section.

The joint portion 24B of the first component 24 is then clamped between the softened half component main bodies 26D, 26E, and in this state the first component 24 and the half component main bodies 26D, 26E are disposed between a first press mold (upper mold) 32A and a second press mold (lower mold) 32B (see FIG. 4) of a press mold 32. A pressing force P is applied to the half component main bodies 26D, 26E in the thickness direction (pressing direction) by the press mold 32 by employing a press working machine, not illustrated in the drawings. Thus, as illustrated in FIG. 4, the half component main bodies 26D, 26E are press molded to the joint portion 24B of the first component 24 so as to follow the outline profile of the joint portion 24B and to be in close contact with the joint portion 24B. This press molding is generally referred to as sheet stamping forming. The press molding conditions (pressing conditions of the sheet stamping forming) for the press mold 32 are a heated temperature of 150° C., a pressing force P of 9800 kN, and a mold retention time of 2 minutes.

The component main body 26A with the half component main body 26D and the half component main body 26E bonded thereto is formed by the press molding, and resin material 26R of the component main body 26A flows uniformly along the outline profile of the joint portion 24B of the first component 24. The joined portion 26B is integrally formed to the component main body 26A by molding the component main body 26A. The second component 26 joined to the first component 24 is thereby formed, thereby completing the component joining structure 30.

Operation and Advantageous Effects of the Present Exemplary Embodiment

In the component joining structure 30 according to the present exemplary embodiment, as illustrated in FIG. 2, the joint portion 24B is provided at the component joining location of the first component 24. The second component 26 is formed by the fiber 26F oriented resin material 26R, and the joined portion 26B is integrally formed to the second component 26. The first component 24 and the second component 26 are joined together by the joined portion 26B making close contact with and being joined to the joint portion 24B.

Figure 5:
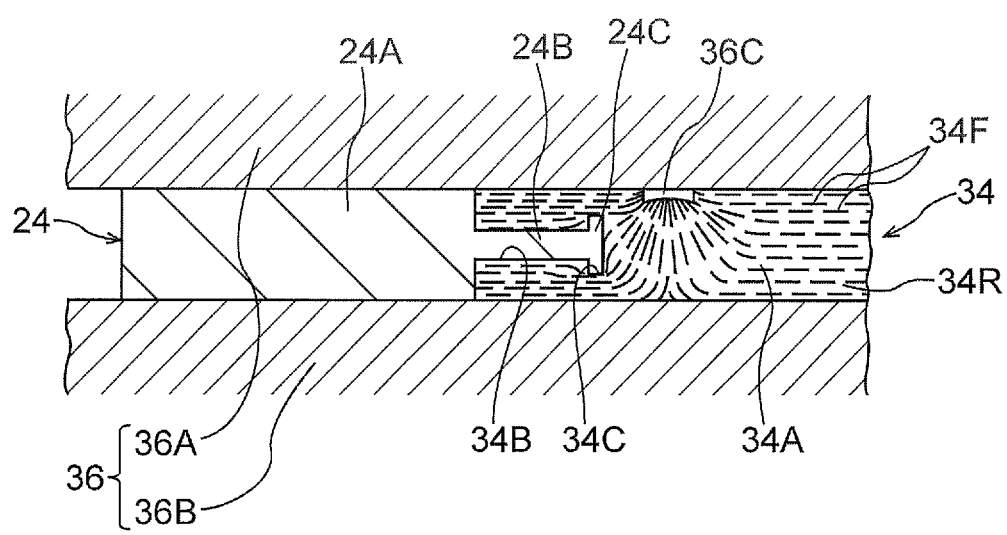
FIG. 5 is a process cross-section to explain a component joining method according to a Comparative Example.

FIG. 5 illustrates a cross-section in a resin forming process to explain a component joining method according to a Comparative Example. In resin transfer molding (RTM) or injection molding methods, a first component 24 is disposed between an upper mold 36A and a lower mold 36B of a forming mold 36, and a resin material 34R is injected into a cavity formed by the upper mold 36A, the lower mold 36B, and the first component 24, so as to mold the second component 34. The configuration of the first component 24 of the Comparative Example is the same as the configuration of the first component 24 in the present exemplary embodiment. The first component 24 includes the component main body 24A, and the joint portion 24B is provided to the component main body 24A. Protrusion leading end portions 24C are also provided to the joint portion 24B. However, second component 34 of the Comparative Example includes a component main body 34A formed by the resin material 34R provided with fibers 34F, and a joined portion 34B joined to the joint portion 24B is provided to the component main body 34A. The joined portion 34B has a recessed shape, and recess bottom portions 34C are configured so as to jut out further in directions toward the periphery of the joined portion 34B than the recessed shaped opening.

In the component joining method according to the Comparative Example, an injection gate 36C is provided in the upper mold 36A. The flowable resin material 34R provided with the fibers 34F is injected into the cavity through the injection gate 36C, and the resin material 34R sets after injection so as to form the second component 34 including the joined portion 34B joined to the joint portion 24B of the first component 24. The resin material 34R flows along the outline profile of the inside of the cavity directly after injection into the cavity, and so the fibers 34F also flow together with the flow of the resin material 34R, such that the fibers 34F become oriented along the flow direction of the resin material 34R. Thus in the second component 34, the fibers 34F have a fixed orientation in the component main body 34A and the joined portion 34B, so as to develop anisotropy in strength of the component main body 34A and the joined portion 34B. Anisotropy in strength is a property in which strength is stronger in one direction, and strength is weaker in another direction.

In contrast to the component joining structure according to the Comparative Example, in the component joining structure 30 according to the present exemplary embodiment, as illustrated in FIG. 2, the fibers 26F of the component main body 26A of the second component 26 are oriented in multiple directions, and the fibers 26F of the joined portion 26B are also oriented in multiple directions. There is accordingly only a small anisotropy in strength of the joined portion 26B, enabling the strength of the joined portion 26B to be raised. Thus the component joining structure 30 according to the present exemplary embodiment enables the join strength to be raised between the first component 24 and the second component 26 formed from resin provided with the fibers 26F.

Moreover, in the component joining structure 30 according to the present exemplary embodiment, as illustrated in FIG. 2, the locations where the protrusion leading end portions 24C of the first component 24 jut out in directions toward the periphery act as anchor portions, and the locations where the recess bottom portion 26C of the second component 26 jut out in directions toward the periphery act as anchored portions, enabling the joined portion 26B to be anchored to the joint portion 24B. This thereby enables the effectiveness with which the second component 26 is prevented from being pulled away from the first component 24 to be improved.

In the component joining structure 30 according to the present exemplary embodiment, as illustrated in FIG. 2, there is a uniform density of the fibers 26F in the joined portion 26B, enabling variation in the strength of the joined portion 26B to be reduced. More precisely, there is only a small variation in the content of the fibers 26F provided per unit volume in the resin material 26R, and so there is an absence of local weakness in strength. This thereby enables the strength of the joined portion 26B to be increased, enabling the quality of the join strength between the first component 24 and the second component 26 to be raised.

In the component joining method according to the present exemplary embodiment, as illustrated in FIG. 3 and FIG. 4, the second component 26 is press molded onto the joint portion 24B for component joining of the first component 24. The first component 24 and the second component 26 are joined together by forming the second component 26 with the joined portion 26B that makes close contact with the joint portion 24B and is joined to the joint portion 24B by press molding.

The second component 26 is formed by the resin material 26R in which the fibers 26F are oriented in multiple directions. When the resin material 26R is press molded, the resin material 26R flows uniformly in the press direction and in peripheral directions to the press direction. The first press mold 32A and the second press mold 32B of the press mold 32 are employed in the press molding (sheet stamping forming) method illustrated in FIG. 4, and so the resin material 26R is pressed and flows uniformly in the up-down direction, and is guided by the press mold 32 so as to flow uniformly in the horizontal direction. The fibers 26F flow uniformly together with the flow of the resin material 26R. This thereby enables the joined portion 26B to be formed by the resin material 26R in which the fibers 26F are oriented in multiple directions. The flow of the resin material 26R is uniform, thereby enabling the joined portion 26B to be formed by the resin material 26R in which the density of the fibers 26F is uniform. In the resin material 26R formed by this component joining method the fibers 26F are oriented in multiple directions, and the density of the fibers 26F is uniform, thereby enabling the strength of the joined portion 26B to be further raised.

In the component joining method according to the present exemplary embodiment, as illustrated in FIG. 3 and FIG. 4, plural pieces of resin material 26R (the half component main bodies 26D, 26E) clamping the joint portion 24B are press molded to form the joined portion 26B. The joined portion 26B is formed by the resin material 26R that has uniformly flowed along the protrusions of the joint portion 24B and the outline profile of the protrusion leading end portions 24C. The fibers 26F provided in the resin material 26R flow together with the flow of the resin material 26R. This thereby enables the joined portion 26B to be formed by the resin material 26R in which the fibers 26F are oriented in multiple directions and the density of the fibers 26F is uniform.

Moreover, in the joined portion 26B, the resin material 26R and the fibers 26F are able to flow completely around the outline profile of the joint portion 24B. More precisely, the resin material 26R and the fibers 26F are able to flow completely into the corners of the joined portion 26B that is recessed shaped and includes the recess bottom portions 26C jutting out in directions toward the periphery of the joined portion 26B. For example, in the resin injection molding method illustrated in FIG. 5, the resin material 34R flows in a fixed direction, with voids (air holes) liable to form at the periphery of the protrusion leading end portions 24C, and leading to the possibility of defect locations being formed in the joined portion 34B. In contrast thereto, in the component joining method according to the present exemplary embodiment, voids are effectively suppressed from occurring, enabling the joined portion 26B to be formed in the intended shape. This thereby enables the strength of the joined portion 26B to be further raised.

Second Exemplary Embodiment

Explanation follows regarding a component joining structure and a component joining method according to a second exemplary embodiment of the present invention, with reference to FIG. 6 to FIG. 9. In the present exemplary embodiment the same reference numerals are allocated to configuration elements the same as, or equivalent to, the configuration elements of the first exemplary embodiment, and duplicate explanation will be omitted thereof.

Component Joining Structure

Figure 6:
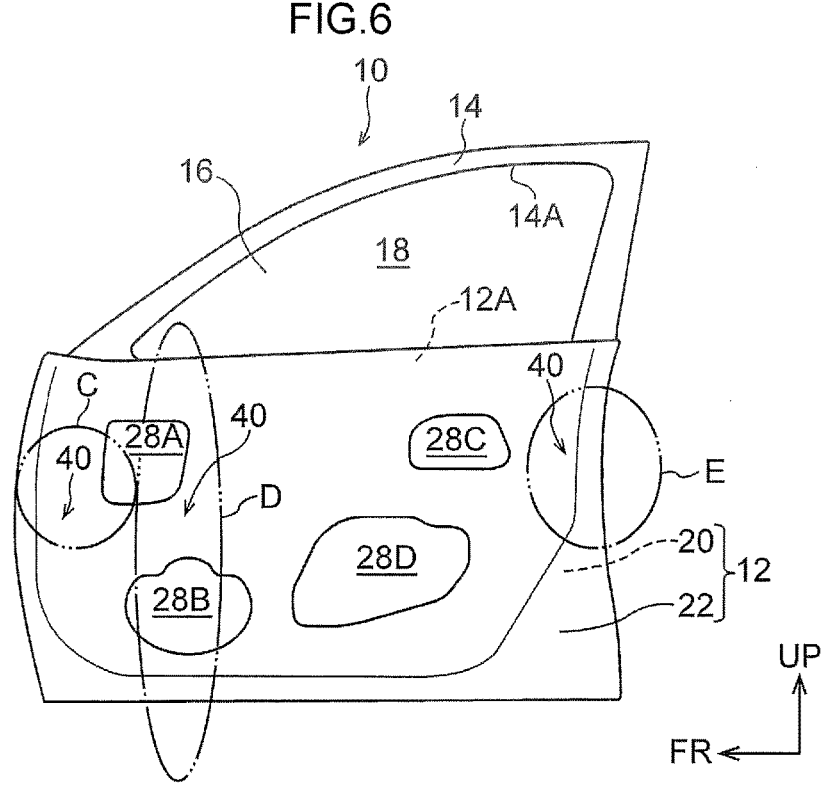
FIG. 6 is side view of a front side door, corresponding to FIG. 1, applied with a component joining structure according to a second exemplary embodiment.

The configuration of a front side door 10 illustrated in FIG. 6 is substantially the same as the above configuration of the front side door 10 illustrated in FIG. 1. A component joining structure 40 according to the present exemplary embodiment is applied to an inner door panel 22 of a door main body 12 at at least one location out of a hinge attachment section of a region C, an insert molding section of a region D, or a door lock section of a region E.

Figure 7:
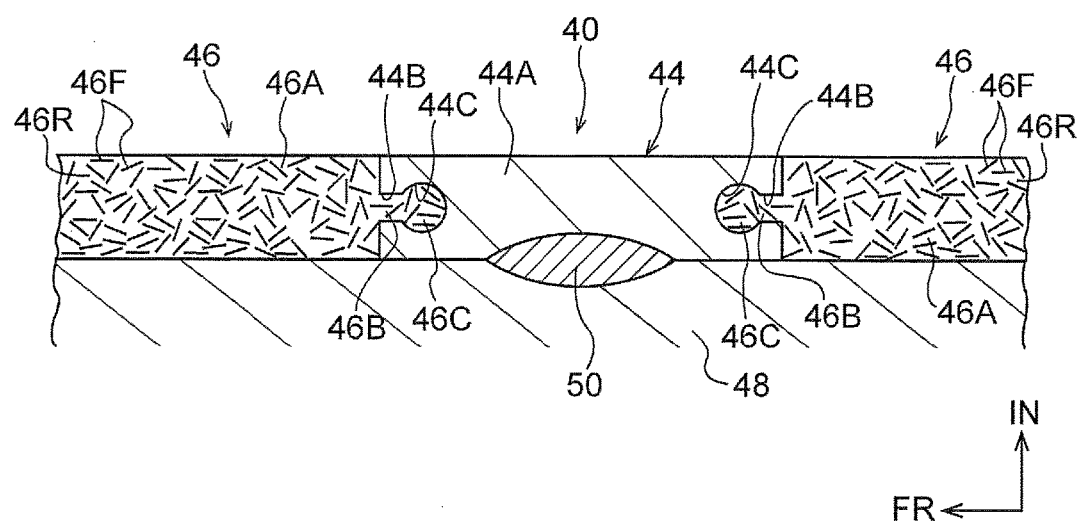
FIG. 7 is a cross-section of the component joining structure illustrated in FIG. 6, as viewed from below a vehicle (a cross-section of region C, region D, or region E in FIG. 6)

As illustrated in FIG. 7, the inner door panel 22 is divided into a first component 44, and two second components 46 provided at the vehicle front and rear directions of the first component 44. The first component 44 and the second components 46 are joined together, and the component joining structure 40 according to the present exemplary embodiment is applied to the joining thereof.

The first component 44 differs in shape according to the applied location, and includes a plate shaped component main body 44A. At each of the ends of the component main body 44A, on the vehicle front side and at the vehicle rear side, the first component 44 is provided with a joint portion 44B that is a component joining location, in order to join the second components 46 to the end portions of the component main body 44A. The joint portion 44B provided at the vehicle front side is configured with a recessed shape of a hollow from the end portion of the component main body 44A toward the vehicle rear side, and is configured with a recess bottom portion 44C configured so as to jut out further than the recess opening portion in each of the directions toward the periphery (vehicle width directions). The joint portion 44B provided at the vehicle rear side is formed with a recessed shape of a hollow from the end portion of the component main body 44A toward the vehicle front side, and is configured with a recess bottom portion 44C configured so as to jut out further in each of the directions toward the periphery (vehicle width directions) than the recess opening portion. Although not illustrated in vehicle side view, the joint portion 44B extends along the vehicle up-down direction. Plural joint portions 44B may be provided at fixed intervals along the vehicle up-down direction. The first component 44 is formed from the same materials as those of the first component 24 in the first exemplary embodiment.

The second components 46 at the vehicle front side and the vehicle rear side each include a plate shaped component main body 46A. The second component 46 at the vehicle front side is provided with a joined portion 46B that configures a component joining location at the end portion at the vehicle rear side of the component main body 46A, and is provided at the end portion of the component main body 46A in close contact with the joint portion 44B of the first component 44, and is joined to the joint portion 44B. The joined portion 46B has a protruding shape that projects out from the end portion of the component main body 46A toward the vehicle rear side and is capable of being housed in the joint portion 44B, and is configured with protrusion leading end portions 46C that jut out in directions toward the periphery of the joint portion 44B (vehicle width directions). The second component 46 at the vehicle rear side is provided with a joined portion 46B that configures a component joining location at the end portion at the vehicle front side of the component main body 46A, and is provided at the end portion of the component main body 46A in close contact with the joint portion 44B of the first component 44, and is joined to the joint portion 44B. The joined portion 46B has a protruding shape that projects out from the end portion of the component main body 46A toward the vehicle front side and is capable of being housed in the joint portion 44B, and is configured with protrusion leading end portions 46C that jut out in directions toward the periphery of the joint portion 44B (vehicle width directions). The second components 46 and the first component 44 are joined together by the joined portions 46B being joined to the joint portions 44B.

The component main body 46A and the joined portions 46B of the second components 46, similarly to in the component main body 26A and the joined portion 26B of the first exemplary embodiment, are formed by a resin material 46R in which fibers 46F are oriented in multiple directions with a uniform density of the fibers 46F. The resin material 46R and the fibers 46F are formed by the same materials as those of the resin material 26R and the fibers 26F of the first exemplary embodiment.

In the component joining structure 40 according to the present exemplary embodiment, as illustrated in FIG. 7, a plate shaped third component 48 is superimposed on the first component 44 and the second component 46 (the inner door panel 22). The third component 48 is provided on the vehicle width direction outside surface of the first component 44, and is, for example, employed as a reinforcement member. The third component 48 is joined to the first component 44 with a junction portion 50 interposed there between. The third component 48 is formed from the same material as that of the first component 44, or is formed of a material that enables the junction portion 50 to be formed between the third component 48 and the first component 44. The junction portion 50 is formed by spot welding.

Component Joining Method

Figure 8:
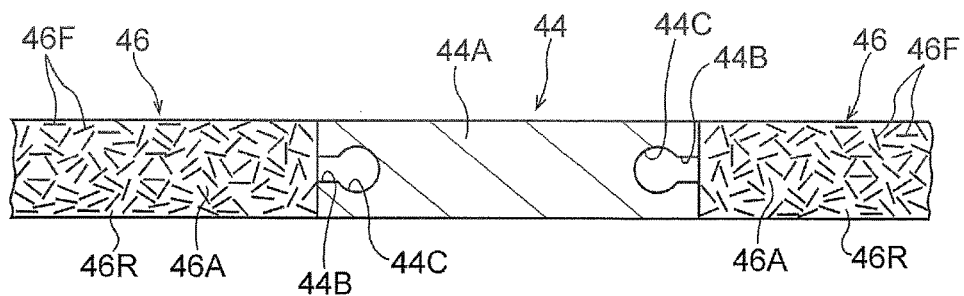
FIG. 8 is first process cross-section to explain a component joining method according to the second exemplary embodiment.

The component joining method according to the present exemplary embodiment is as described below. First, as illustrated in FIG. 8, the first component 44 and plural sheet shaped second components 46 (two sheets in this example) are formed. The first component 44 includes the joint portions 44B (and the recess bottom portions 44C) respectively formed at the two end portions of the component main body 44A. The second component 46 is formed by the resin material 46R in which fibers 46F are oriented in multiple directions and with a uniform density of the fibers 46F.

Figure 9:
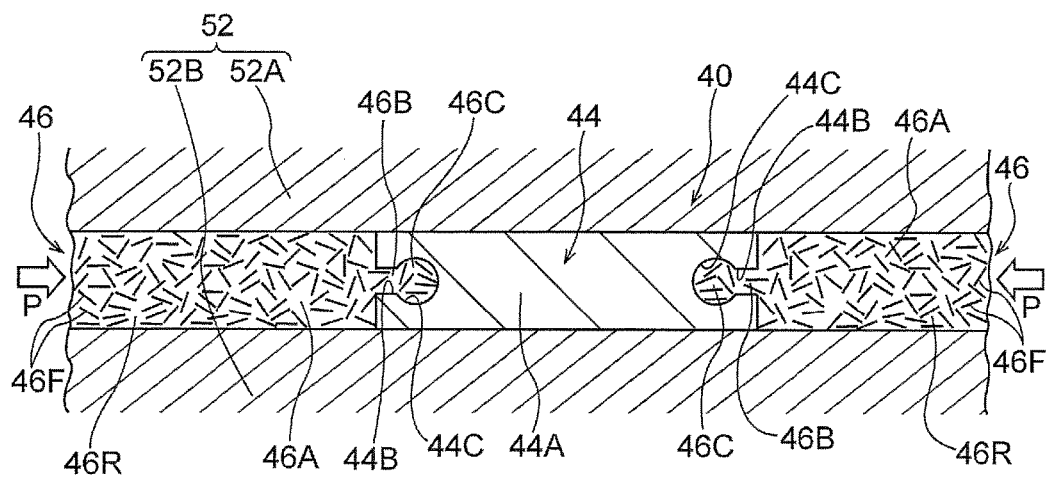
FIG. 9 is a second process cross-section.

Then pre-heating is performed, and the second components 46 are pre-heated and softened. The pre-heating conditions are the same as the pre-heating conditions of the component joining method according to the first exemplary embodiment. The first component 44 and the softened second components 46 are then disposed in a first press mold (upper mold) 52A and a second press mold (lower mold) 52B of a press mold 52, and clamped (see FIG. 9). A pressing force P is applied along the face direction of the second components 46 by employing a press working machine, not illustrated in the drawings. Thus, as illustrated in FIG. 9, the second components 46 are pressed into the joint portions 44B of the first component 44, and part of the resin material 46R of the second components 46 flows along and fills the outline profile of the joint portions 44B, molding and forming the joined portions 46B. In other words, the joined portions 46B are formed by caulking the resin material 46R inside the joint portions 44B. The resin material 46R flows uniformly due to the press molding, and so the fibers 46F provided in the resin material 46R also flow uniformly. The joined portions 46B are accordingly formed by the resin material 46R in which the fibers 46F are oriented in multiple directions, and with a uniform density of the fibers 46F. The press molding conditions are the same as the press molding conditions of the component joining method according to the first exemplary embodiment. The second components 46 are thereby joined to the first component 44, completing the component joining structure 40.

Operation and Advantageous Effects of the Present Exemplary Embodiment

In the component joining structure 40 according to the present exemplary embodiment, similarly to in the component joining structure 30 according to the first exemplary embodiment, as illustrated in FIG. 7, the fibers 46F of the joined portions 46B of the second components 46 are oriented in multiple directions, enabling the strength of the joined portions 46B to be raised. The component joining structure 40 thereby enables the join strength to be raised between the first component 44 and the second components 46.

Moreover, in the component joining structure 40 according to the present exemplary embodiment, as illustrated in FIG. 7, the recess bottom portion 44C of the first component 44 are locations that jut out in directions toward the periphery and act as anchor portions, and the protrusion leading end portions 46C of the second components 46 are locations that jut out in directions toward the periphery and act as anchored portions. The joined portions 46B are thereby anchored to the joint portions 44B, enabling the effectiveness with which the second components 46 are prevented from being pulled away from the first component 44 to be raised.

Moreover, in the component joining structure 40 according to the present exemplary embodiment, the density of the fibers 46F in the joined portions 46B of the second components 46 is uniform, enabling variation in the strength of the joined portions 46B to be reduced. This thereby enables the strength of the joined portions 46B to be raised, enabling the quality of the join strength between the first component 44 and the second components 46 to be raised.

In the component joining method according to the present exemplary embodiment, as illustrated in FIG. 8 and FIG. 9, the second components 46 are press molded to the joint portions 44B for component joining of the first component 44. The joined portions 46B are placed in close contact with the joint portions 44B and joined to the joint portions 44B by the press molding so as to form the second component 46, joining the first component 44 and the second components 46 together.

The second components 46 are formed by the resin material 46R in which the fibers 46F are oriented in multiple directions. When the resin material 46R is press molded, the resin material 46R flows uniformly in the press direction and in peripheral directions to the press direction. In the press molding illustrated in FIG. 9, the first press mold 52A and the second press mold 52B of the press mold 52 are employed so that the resin material 46R is pressed and flows in the horizontal direction, and flows in the up-down direction. The fibers 46F provided in the resin material 46R also flow together with the flow of the resin material 46R. This thereby enables the joined portions 46B to be formed by the resin material 46R in which the fibers 46F are oriented in multiple directions and there is a uniform density of the fibers 46F.

Moreover, in the component joining method according to the present exemplary embodiment, the joined portions 46B are formed with the resin material 46R press molded (caulked) inside the joint portions 44B, and so the joined portions 46B are formed by the resin material 46R that has flowed uniformly along the recessed shape of the joint portions 44B and the outline profile of the recess bottom portions 44C. This thereby enables the joined portions 46B to be formed by the resin material 46R in which the fibers 46F are oriented in multiple directions and there is a uniform density of the fibers 46F. In addition, the resin material 46R and the fibers 46F in the joined portions 46B are able to flow completely around the outline profile of the joint portions 44B.

In the component joining structure 40 according to the present exemplary embodiment, as illustrated in FIG. 7, the third component 48 is joined to the first component 44 using the junction portion 50. For example, in cases in which the first component 44 and the third component 48 are formed from the same material, joining can be achieved by spot welding using known equipment. More precisely, although special equipment is normally required for joining together different types of material, such special equipment is not required. This thereby enables the component joining structure 40 in which the third component 48 is simply joined to the first component 44 to be implemented by using known equipment.

The component joining structure 40 according to the present exemplary embodiment is configured with the two second components 46 joined to the single first component 44, however, configuration may be made such that two first components 44 are joined to a single second component 46. Configuration may also be made in which a single second component 46 is joined to a single first component 44.

The component joining structure 40 according to the present exemplary embodiment may also be combined with the component joining structure 30 according to the first exemplary embodiment. For example, the third component 48 of the component joining structure 40 according to the second exemplary embodiment may be joined to the first component 24 of the component joining structure 30 according to the first exemplary embodiment.

Supplementary Explanation to the Above Exemplary Embodiments

The present invention is not limited to the above exemplary embodiments, and various modifications may be made within a range not departing from the spirit of the present invention. For example, although in the above exemplary embodiments the first component is made from a metal material, a light metal material, or an alloy material, a first component may be employed in the present invention that is formed from a resin material that is harder than the second component, or from a resin material provided with fibers. Moreover, in the present invention the first component and the second component are not limited to being plate shaped, and may be block shaped.

In the above exemplary embodiments, the component joining structure and the component joining method are employed to components of a front side door of an automobile, in the present invention, the component joining structure and the component joining method of the may be applied to components of a rear side door, a back door, a hood, a luggage rack, a roof, etc. of an automobile.

Moreover, the component joining structure and component joining method of the present invention may also be applied to components of vehicles other than automobiles, and to components of buildings.

What is claimed is:

1. A component joining structure comprising:
   a first component comprising a main body and a joint portion, wherein the joint portion has a protruding shape, and the first component is configured such that a recess is formed between a leading end of the joint portion and the main body the first component;
   a second component formed from a resin material, the resin material being formed from a plurality of sheet-shaped resin materials, fibers in each of the plurality of sheet-shaped resin materials being oriented in a single direction, and the plurality of sheet-shaped resin materials being superimposed on each other such that the fibers are oriented in multiple directions in three dimensions; and
   a joined portion that is integrally formed to the second component using the resin material, and that is in close contact with the joint portion and is joined to the joint portion; wherein
      the resin material and the fibers oriented in multiple directions are provided at locations of the joined portion which face the leading end of the joint portion, and at locations of the joined portion which face lateral sides of the joint portion such that the resin material and the fibers are present in the recess that is formed between the main body of the first component and the leading end of the joint portion thereof.

2. The component joining structure of claim 1, wherein the joint portion is configured as a protrusion leading end portion that juts out in a direction toward the periphery of the joint portion, and
   the joined portion is a recessed shape on part of the second component, capable of housing the joint portion and configured with a recess bottom portion that juts out further in a direction toward the periphery of the joined portion than a recess opening portion.

3. The component joining structure of claim 1, wherein a density of the fibers is uniform in the joined portion.

* * * * *